(12) United States Patent
Sawayanagi et al.

(10) Patent No.: US 7,425,087 B2
(45) Date of Patent: Sep. 16, 2008

(54) LAMP UNIT

(75) Inventors: Masahiro Sawayanagi, Shizuoka (JP);
Katsutoshi Kamiya, Aichi (JP);
Kazutaka Toyoda, Aichi (JP)

(73) Assignee: Yazaki Corporation, Tokyo (JP)

( * ) Notice: Subject to any disclaimer, the term of this patent is extended or adjusted under 35 U.S.C. 154(b) by 121 days.

(21) Appl. No.: 11/339,678

(22) Filed: Jan. 26, 2006

(65) Prior Publication Data

US 2006/0171156 A1 Aug. 3, 2006

(30) Foreign Application Priority Data

Jan. 31, 2005 (JP) ............... 2005-024270

(51) Int. Cl.
*B60Q 1/26* (2006.01)
(52) U.S. Cl. ............... 362/490; 362/487; 362/488; 362/489; 362/492; 362/494
(58) Field of Classification Search ......... 362/487–490, 362/498, 518, 520, 544, 543, 337, 339, 492, 362/494, 23, 125, 154, 157, 166, 214, 255, 362/317, 315

See application file for complete search history.

(56) References Cited

U.S. PATENT DOCUMENTS 5,633,623 A * 5/1997 Campman ............... 340/321
6,814,475 B2 * 11/2004 Amano .................. 362/487

FOREIGN PATENT DOCUMENTS

| DE | 198-31004 A1 | 7/1998 |
| DE | 200-05864 U1 | 3/2000 |
| DE | 103-61363 A1 | 12/2003 |
| JP | 2004-203344 | 7/2004 |

* cited by examiner

*Primary Examiner*—Sandra L. O'Shea
*Assistant Examiner*—Mark Tsidulko
(74) *Attorney, Agent, or Firm*—Kratz, Quintos & Hanson LLP

(57) ABSTRACT

The present invention is to provide a better design, and a uniform and bright lighting to a cover lens. A lamp holder holds a lamp L and a lamp bezel holds the lamp holder. The lamp bezel is attached to a roof of a vehicle. The cover lens covers a front side of the lamp bezel and the lamp holder. A part of the cover lens is embossed so as that the lamp holder is hardly visible through the cover lens from a front side of the cover lens. The part is thinly embossed as approaching to a periphery of the part in order to increase a light transmittance.

6 Claims, 5 Drawing Sheets

LAMP UNIT

BACKGROUND OF THE INVENTION

1. Field of the Invention

The present invention relates to a lamp unit, more specifically to a lamp unit having a lamp holder to hold a lamp, a lamp attachment for holding the lamp holder and being attached to an object, and a transparent cover attached to the lamp attachment and covering a front side of the lamp attachment and the lamp holder.

2. Description of the Related Art

FIGS. 6A and 6B show a conventional room lamp as a lamp unit to be attached to a roof of a vehicle. Refer to JP-2004-203344,A. FIG. 6A is a front view of the room lamp and FIG. 6B is a front perspective view thereof with a cover lens 30 being removed.

As shown in FIGS. 6A and 6B, the room lamp includes a lamp holder 10 to hold a lamp L, a lamp bezel (lamp attachment) 20 for holding the lamp holder 10 and being attached to the roof of the vehicle, and the cover lens (transparent cover) 30 attached to the lamp bezel 20 and covering all over a front side of the lamp bezel 20 and the lamp holder 10.

The lamp bezel 20 has a lamp window 21 in the center and holds the lamp holder 10 for the lamp L to be exposed to the front side thereof through the lamp window 21. The lamp bezel 20 has attachment portions 24, such as engaging claws, to be engaged with engaged holes (not shown) disposed at the roof of the vehicle, at a rear surface thereof. The lamp bezel 20 has a plurality of through-holes 25 therein. The plurality of the through-holes 25 are formed when the attachment portions 24 are formed by die-cutting the lamp bezel 20. Screw holes also become the through-holes 25.

As shown in FIG. 6B, the lamp bezel 20 has sliding grooves 23 in a longitudinal direction thereof. A sliding member 40 is slidably engaged with the sliding grooves 23 at the front side of the lamp bezel 20. A knob 41 is disposed at a front side of the sliding member 40 and exposed to outside from a front opening 31 of the cover lens 30. The sliding member 40 is slid by means of the knob 41 so as to turn on and off the lamp L.

A whole area of a rear surface of the cover lens 30 is embossed so as that the lamp holder 10, the through-holes 25 formed in the lamp bezel 20, and the sliding grooves 23 are not visible from a front side of the room lamp, i.e., the cover lens 30 appears cloudy.

Then, the cover lens 30 loses transparency and appearance design. In the conventional lamp unit, the cover lens 30 is embossed entirely and has a uniform light transmittance. However, when the cover lens 30 is embossed thinly in order to increase the light transmittance and brightness, the lamp holder 10 or through-holes 25 formed in the lamp bezel 20 becomes visible through the cover lens 30. On the contrary, when the cover lens 30 is embossed densely for the lamp holder 10 or the through-holes 25 to be invisible, the brightness is reduced.

The uniform light transmittance of the conventional cover lens 30 results in that the brightness of the cover lens 30 is high at an area close to the lamp L and becomes lower with a distance from the lamp L.

SUMMARY OF THE INVENTION

The present invention is to provide a better design, and a uniform and higher brightness to a cover lens of a lamp unit.

According to a first aspect of the present invention, a lamp unit includes a lamp holder to hold a lamp; a lamp attachment for holding the lamp holder and being attached to an object; a transparent cover attached to the lamp attachment and for covering a front side of the lamp attachment and the lamp holder; wherein the transparent cover has a part having a less light transmittance than that of an area outside the part, the lamp holder being visible through the part from a front side of the transparent cover.

Preferably, the part of the transparent cover is embossed.

Preferably, the part has a high light transmittance as approaching to a periphery of the part.

Preferably, the transparent cover has a plurality of prism lenses having a square pyramid shape at a rear surface thereof.

Preferably, the lamp unit further includes opaque covers attached to the lamp attachment and covering all over through-holes from the front side of the lamp attachment, and the transparent cover is attached in front of the opaque covers.

Preferably, the lamp attachment has sliding grooves and a sliding member, which is disposed at the front side of the lamp attachment and slidably engaged with the sliding grooves and has an operating knob exposed from the transparent cover, and the sliding member always covers all over the sliding grooves irrespective of the location of the sliding member within a sliding range.

Preferably, the lamp attachment is attached to the object with the front side down, the opaque covers are attached on a line extending from a sliding direction, and the sliding member is formed to extend into the sliding direction so as to have overlapped portions with at least a portion of the opaque covers irrespective of the location of the sliding member within the sliding range.

DETAILED DESCRIPTION OF THE PREFERRED EMBODIMENTS

Figure 1:
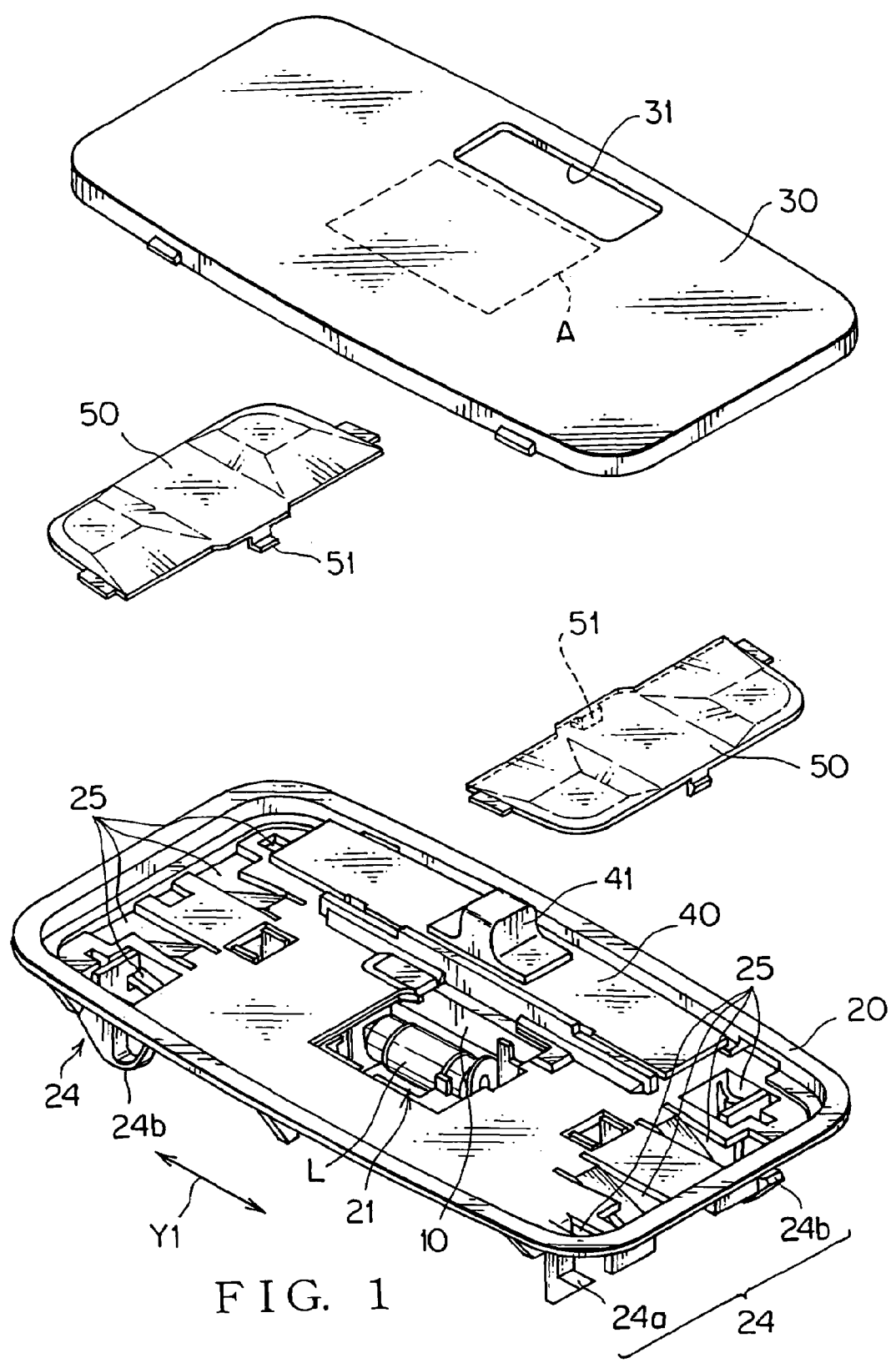
FIG. 1 is an exploded front perspective view of a room lamp of an embodiment of a lamp unit of the present invention.
Figure 2:
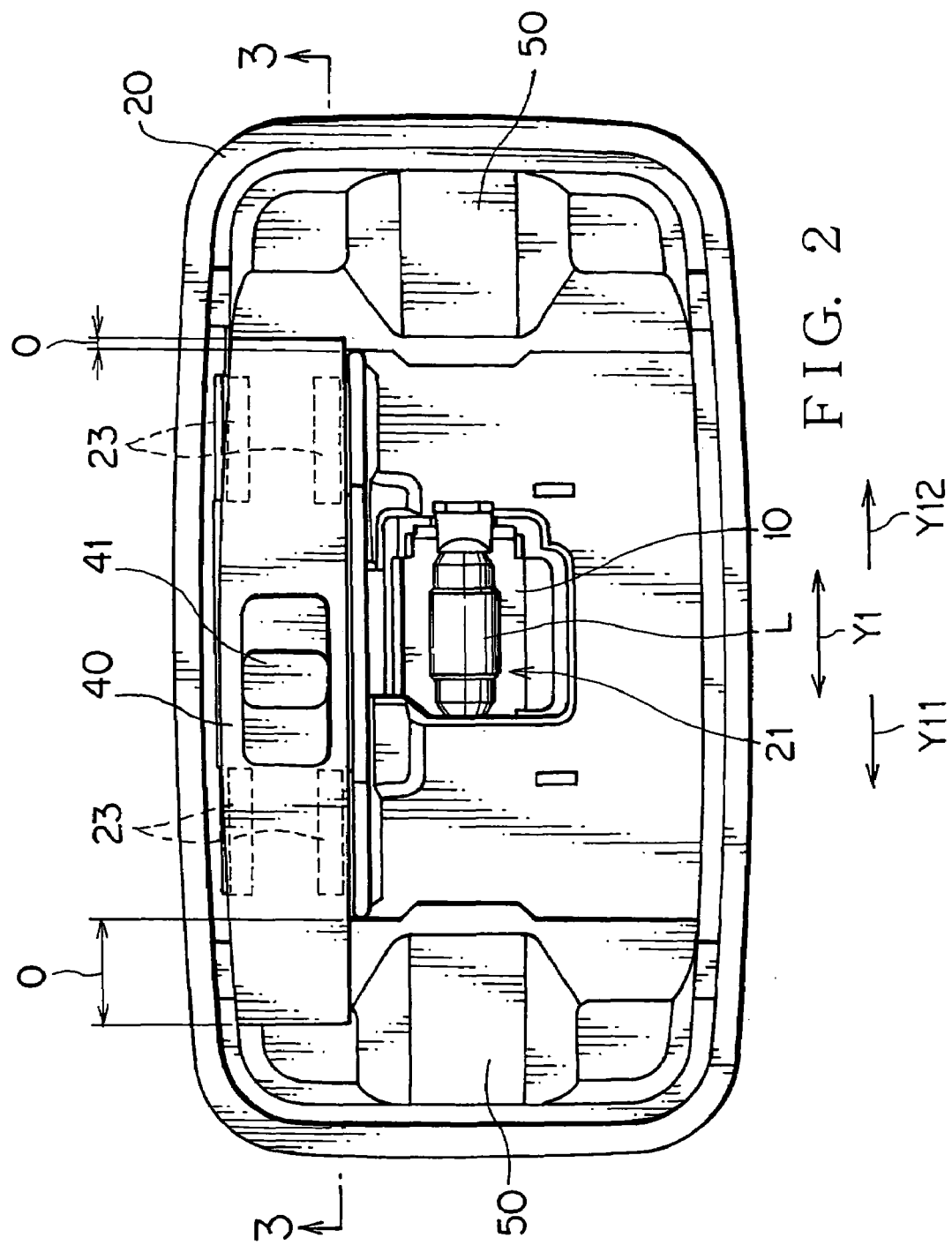
FIG. 2 is a front view of the room lamp of FIG. 1 with a cover lens 30 being removed.

A lamp unit of the present invention is explained by referring to figures. FIG. 1 is an exploded front perspective view of a room lamp of an embodiment of the lamp unit of the present invention. FIG. 2 is a front view of the room lamp with a cover lens 30 in FIG. 1 being removed. As shown in FIG. 1, the room lamp has a lamp holder 10 to hold a lamp L, a lamp bezel 20 (lamp attachment) having a rectangular plate shape for holding the lamp holder 10 and being attached to a roof of a vehicle, and the transparent cover lens 30 (transparent cover) attached to the lamp bezel 20 and covering all over a front side of the lamp holder 10 and the lamp bezel 20.

The lamp bezel 20 is attached to the roof of the vehicle with a front side of the cover lens 30 down. The lamp bezel 20 has the lamp holder 10 for the lamp L to appear from a lamp window 21 disposed at the center of the cover lens 30. As shown in FIG. 1, the lamp bezel 20 has attachment portions 24, such as roof attachment projections 24a and body attachment projections 24b, disposed at a rear surface thereof and both ends in a direction Y1 to which the lamp window 21 slides. As described later, a sliding member 40 slides into the direction of Y1.

As shown in FIG. 1, the lamp bezel 20 has a plurality of through-holes 25 therein. In this embodiment, the plurality of the through-holes 25 are formed when the attachment portions 24 are formed by die-cutting the lamp bezel 20. Screw holes also become the through-holes 25. A pair of opaque covers 50 are disposed on both sides of the lamp bezel 20 in the direction of Y1 and cover all over the through-holes 25 from the front side of the bezel 20. The opaque covers 50 are engaged with engaged holes of the lamp bezel 20 by means of engaging claws 51 of the opaque covers 50. The opaque covers 50 cover the through-holes 25 so as that the through-holes 25 are not visible when they are viewed from a front side of the lamp bezel 20 with the cover lens 30 removed.

As shown in FIG. 2, the lamp bezel 20 has sliding grooves 23 in a longitudinal direction thereof. The sliding member 40 is slidably engaged with the sliding grooves 23 at the front of the lamp bezel 20. Locking claws are disposed behind of the sliding member 40 and slidably engaged with the sliding grooves 23. A knob 41 is disposed at the front of the sliding member 40 and exposed to outside from a front opening 31 of the cover lens 30. The sliding member 40 is slid by means of the knob 41 so as to turn on and off the lamp L.

A part of the each opaque cover 50 is placed on a line L1 extending from the sliding direction of Y1. The sliding member 40 extends into the sliding direction of Y1 so as to always cover the front faces of the parts of the opaque covers 50 irrespective of the location thereof within a sliding range.

Figure 3:
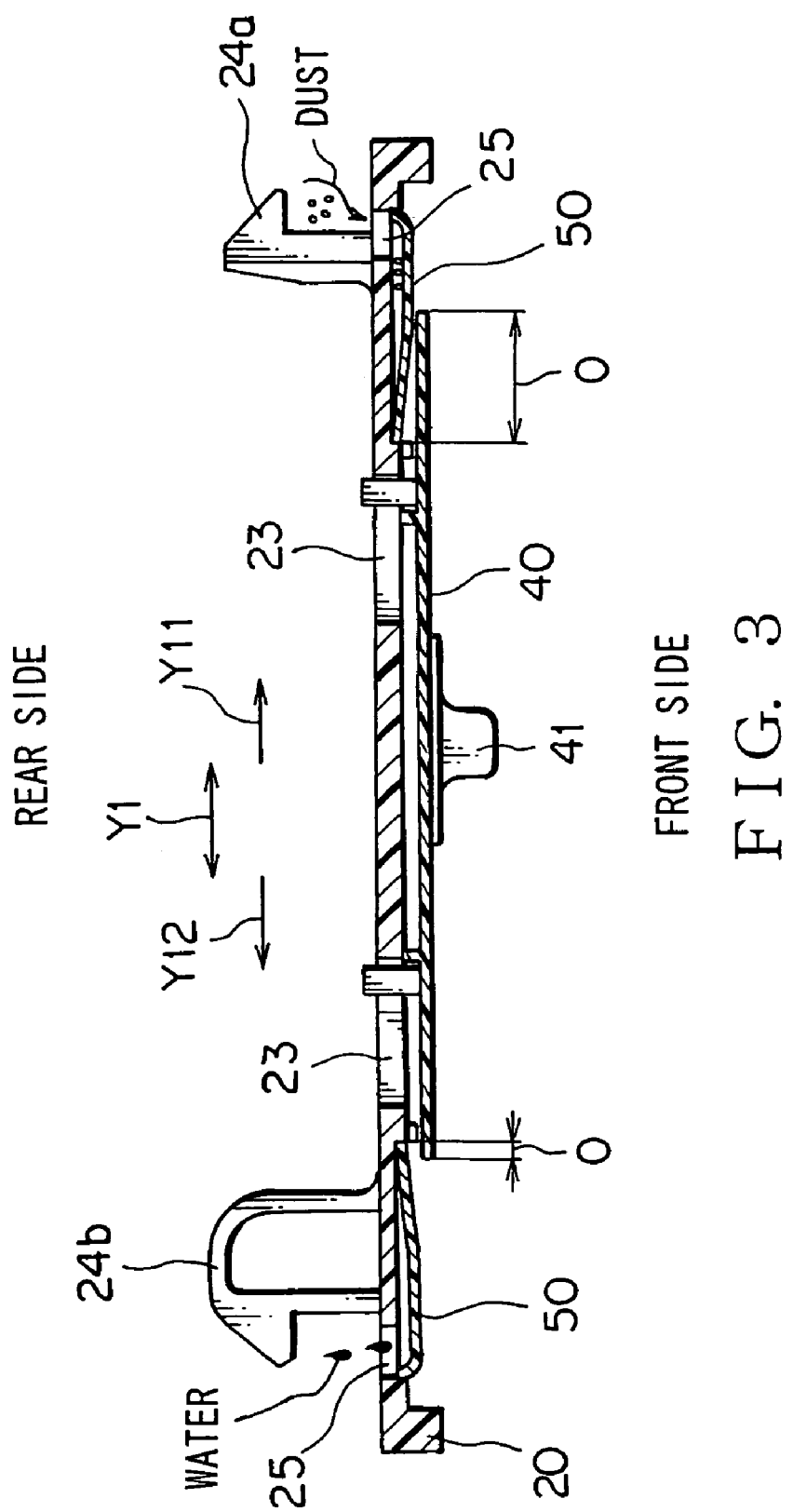
FIG. 3 is a sectional view taken along a line 3-3 of FIG. 2.

As shown in FIGS. 2 and 3, when the sliding member 40 is slid to a side of Y11 in the sliding direction of Y1, an overlapped portion O is formed between the sliding member 40 and the opaque cover 50 at a side of Y12. When the sliding member 40 is slid to a side of Y12 in the sliding direction of Y1, the overlapped portion O is similarly formed between the sliding member 40 and the opaque cover 50 at a side of Y11. Accordingly, the sliding member 40 always covers all of the sliding grooves 23 irrespective of the location thereof so that the sliding grooves 23 can not be seen from the front side of the lamp bezel 20 with the cover lens 30 being removed.

Figure 4A:
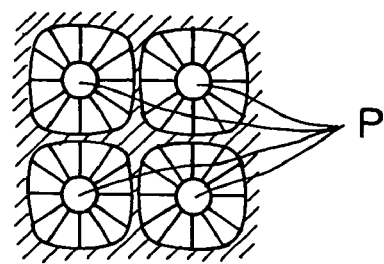
FIG. 4A is a partial rear view of the cover lens 30 of FIG. 1.
Figure 4B:
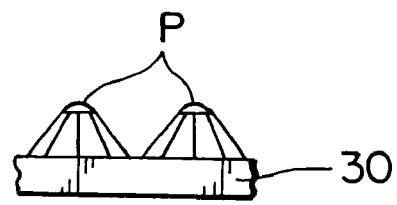
FIG. 4B is a partial side view of prism lenses P disposed at a rear surface of the cover lens.
Figure 5:
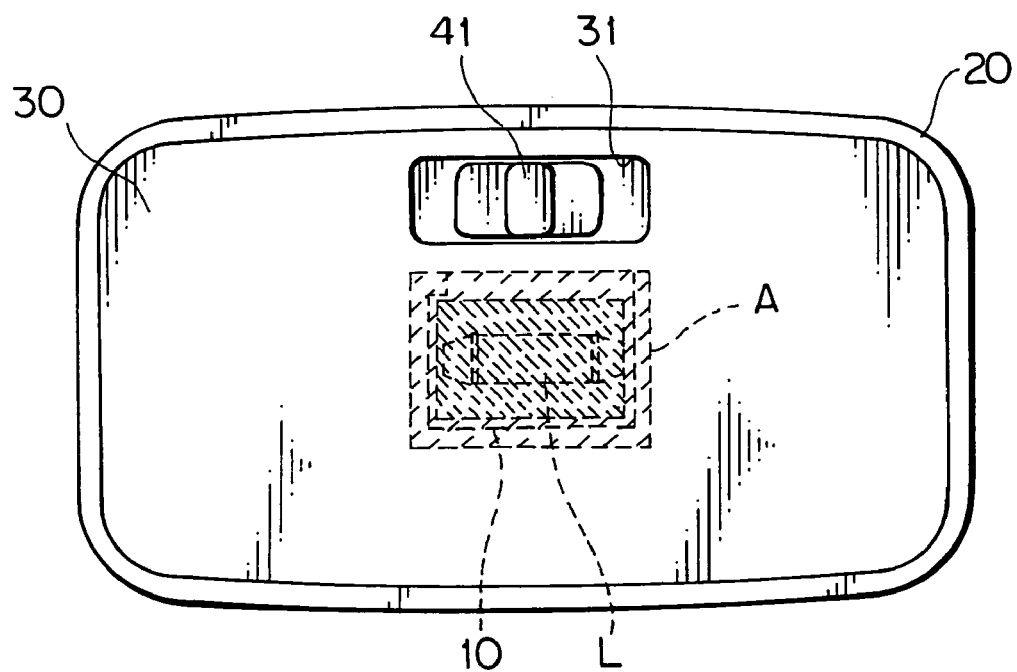
FIG. 5 is a front view of the lamp unit of FIG. 1.
Figure 6A:
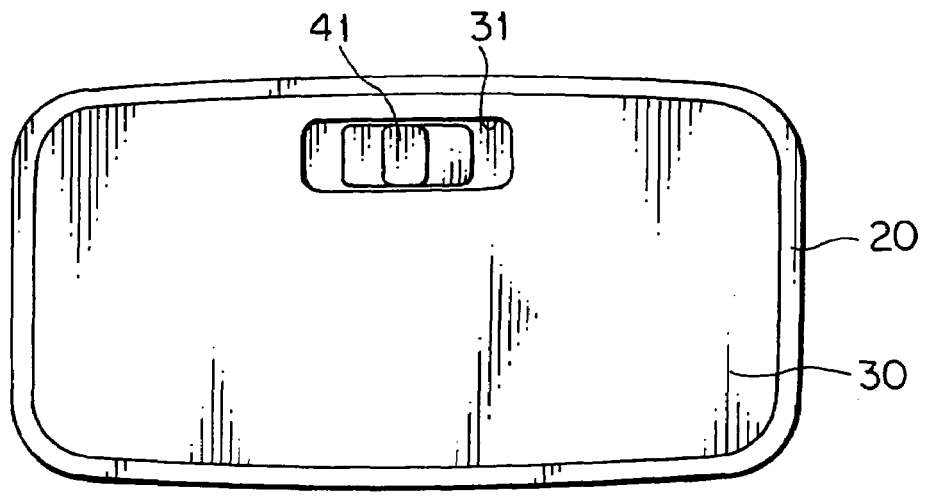
FIG. 6A is a front view of a conventional room lamp.
Figure 6B:
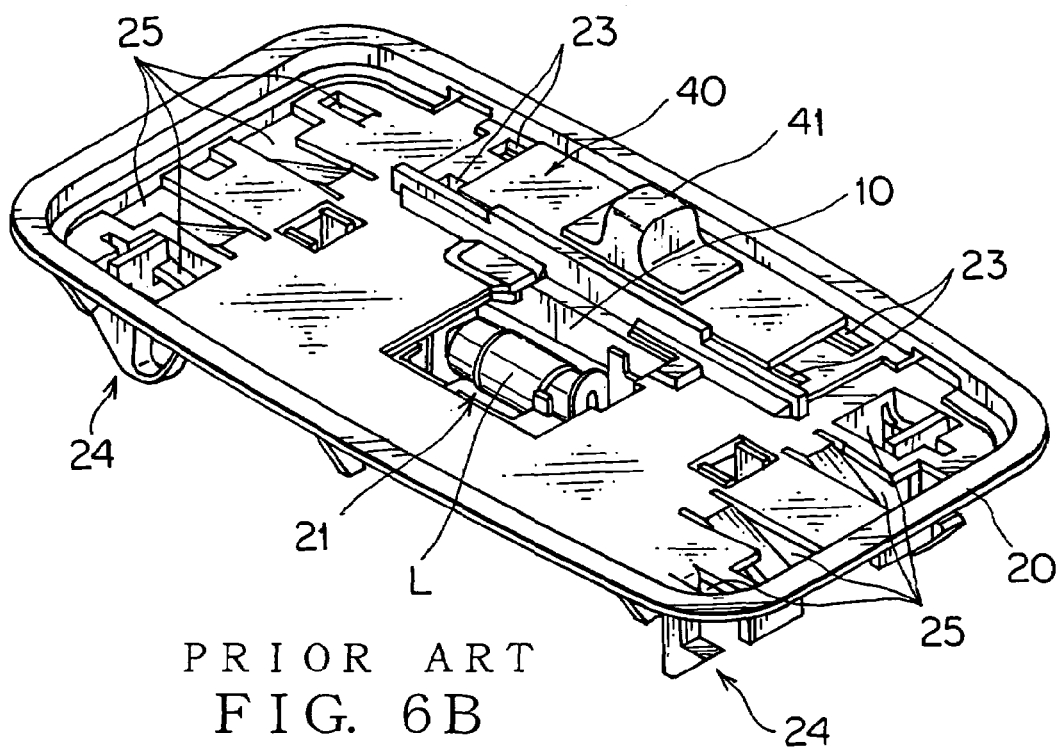
FIG. 6B is a front perspective view of the room lamp with a cover lens 30 being removed.

As shown in FIGS. 4A and 4B, the cover lens 30 has a plurality of prism lenses P having a square pyramid shape at a rear surface thereof. In the embodiment of the present invention, the square pyramid is not limited to a rigorous square but includes pyramids having rounded top or corners. As shown in FIGS. 1 and 5, a part A of the rear surface of the cover lens 30 is embossed so as to diffusely reflect a light from the lamp L. The part A is an area through which the lamp holder 10 is visible from the front side of the cover lens 10. An area between the prism lenses P is embossed as shown by diagonal lines in FIG. 4A.

Accordingly, a light transmittance of the part A is reduced compared to an other area surrounding the part A. Thus, the lamp holder 10 can not be seen clearly from the front side of the cover lens 30. Since the other area surrounding the part A is not embossed, the cover lens 30 keeps a high light transmittance and provides a clear appearance so that a design and brightness are improved. The cover lens 30 is embossed only in the part A close to the lamp L to reduce the light transmittance compared to the other area of the cover lens so that the uniform brightness at the cover lens 30 is attained.

As shown in FIG. 5, a peripheral area of the part A, denoted by coarse diagonal lines, is embossed thinly compared to the area inside the periphery, denoted by fine diagonal lines, so as to increase the light transmittance at the peripheral area. With a stepped increase of the light transmittance along a direction from the center of the part A to the peripheral area, a boundary between the embossed part A and the other area surrounding the part A becomes less apparent. Accordingly, the uniform brightness is attained and a design of the lamp unit is further improved.

The square pyramid-shaped prism lenses P disposed at the rear surface of the cover lens 30 diffuse and emit the light from the lamp L. This arrangement provides a high grade lighting.

When the lamp bezel 20 has the through-holes 25, which are formed when the attachment portions 24 are manufactured, outside the part A, the through-holes 25 are visible through the cover lens 30 and reduce a design of the room lamp. In the present invention, the through-holes 25 are covered with the opaque covers 50 which are covered with the cover lens 30 so that the through-holes 25 are not visible from the front side of the cover lens 30 and the design of the room lamp is improved. As shown in FIG. 3, the opaque covers 50 prevent dusts or water from entering into the cover lens 30 through the through-holes 25 and protect the cover lens 30 from dirt and burning.

When the sliding member 40 does not cover the sliding grooves 23 in the conventional room lamp, the sliding grooves 23 disposed outside the part A are visible through the cover lens 30. In the embodiment of the present invention, the sliding member 40 always covers all over the sliding grooves 23 irrespective of the location of the sliding member 40 so that the sliding grooves 23 disposed outside the part A are not visible from the front side of the cover lens 30. This arrangement improves the design of the room lamp. The sliding grooves 23 are covered with the sliding member 40 without other member so that the sliding member 40 is moved without interference. This results in an easy assembly and low cost manufacturing.

Since the sliding member 40 is formed to extend into Y1 direction to be overlapped to the opaque covers 50, the sliding member 40 supports the opaque covers 50 when the opaque covers 50 are unlocked and dropped off. Then, when the cover lens 30 is removed for a maintenance of the room lamp, the opaque covers 50 do not drop off.

It is not necessary to attach the opaque covers 50 to the lamp bezel 20 when the through-holes 25 are not formed or a small size.

The cover lens 30 can be embossed all over the area thereof. In this case, the part A is embossed densely than the area outside the part A to reduce the light transmittance at the part A.

The light transmittance at an area, through which the through-holes 25 and the sliding grooves 23 are visible, can be reduced compared to the outside area.

What is claimed is:

1. A lamp unit comprising:
a lamp holder to hold a lamp;
a lamp attachment for holding the lamp holder and being attached to an object; and
a transparent cover, having a rear surface, attached to the lamp attachment and for covering a front side of the lamp attachment and the lamp holder,
wherein said transparent cover has an embossed part on said rear surface, the embossed part having a less light transmittance than that of an area outside the embossed part, and when the lamp is on the lamp and lamp holder being are directly visible through the embossed part from a front side of the transparent cover providing uniform brightness.

2. The lamp unit as claimed in claim 1, wherein said embossed part has a high light transmittance as approaching to a periphery of the embossed part.

3. The lamp unit as claimed in claim 1, wherein said transparent cover has a plurality of prism lenses having a square pyramid shape at said rear surface thereof.

4. A lamp unit comprising:
a lamp holder to hold a lamp;
a lamp attachment for holding the lamp holder and being attached to an object; and
a transparent cover attached to the lamp attachment and for covering a front side of the lamp attachment and the lamp holder,
wherein said transparent cover has a part having a less light transmittance than that of an area outside the part, the lamp holder being visible through the part from a front side of the transparent cover; and
opaque covers are attached to the lamp attachment and cover all over through-holes from the front side of the lamp attachment, the transparent cover being attached in front of the opaque covers.

5. A lamp unit comprising:
a lamp holder to hold a lamp;
a lamp attachment for holding the lamp holder and being attached to an object; and
a transparent cover attached to the lamp attachment and for covering a front side of the lamp attachment and the lamp holder,
wherein said transparent cover has a part having a less light transmittance than that of an area outside the part, and when the lamp is on the lamp holder is directly visible through the part from a front side of the transparent cover providing uniform brightness; and
wherein said lamp attachment has sliding grooves and a sliding member, which is disposed at the front side of the lamp attachment and slidably engaged with the sliding grooves and has an operating knob exposed from the transparent cover, the sliding member always covering all over the sliding grooves irrespective of the location of the sliding member within a sliding range.

6. A lamp unit comprising:
a lamp holder to hold a lamp;
a lamp attachment for holding the lamp holder and being attached to an object; and
a transparent cover attached to the lamp attachment and for covering a front side of the lamp attachment and the lamp holder,
wherein said transparent cover has a part having a less light transmittance than that of an area outside the part, the lamp holder being visible through the part from a front side of the transparent cover;
wherein said lamp attachment has sliding grooves and a sliding member, which is disposed at the front side of the lamp attachment and slidably engaged with the sliding grooves and has an operating knob exposed from the transparent cover, the sliding member always covering all over the sliding grooves irrespective of the location of the sliding member within a sliding range; and
wherein said lamp attachment is attached to the object with the front side down, opaque covers are attached on a line extending from a sliding direction, and the sliding member is formed to extend into the sliding direction so as to have overlapped portions with at least a portion of the opaque covers irrespective of the location of the sliding member within the sliding range.

* * * * *